July 7, 1942.  F. C. BEST  2,289,173

MOTOR VEHICLE

Filed Jan. 21, 1939  3 Sheets-Sheet 1

INVENTOR.
Frank C. Best

BY
Sibetto + Hart
ATTORNEYS

July 7, 1942.   F. C. BEST   2,289,173
MOTOR VEHICLE
Filed Jan. 21, 1939   3 Sheets-Sheet 2
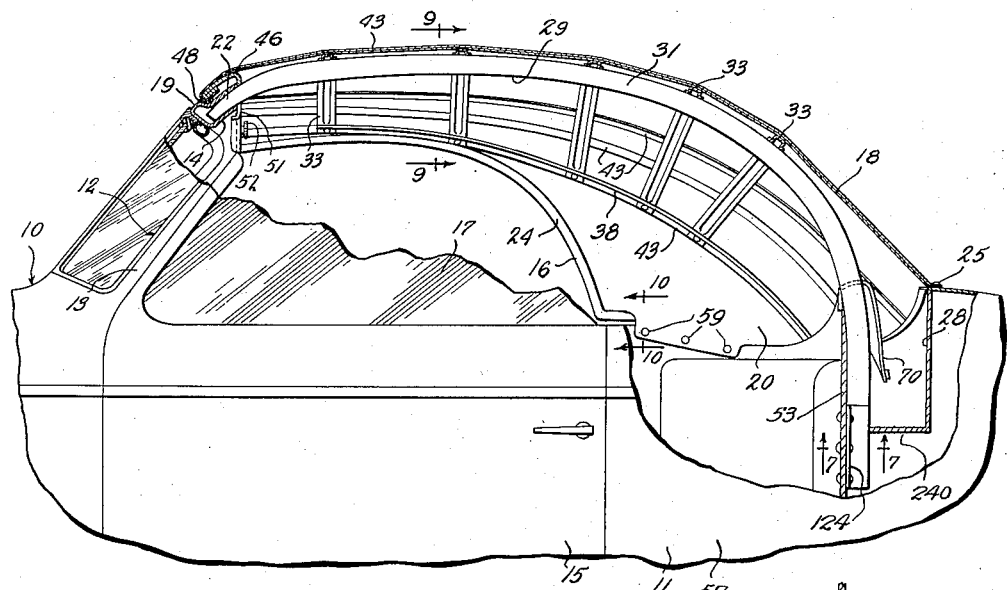
Fig. 3.
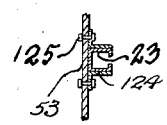
Fig. 7.
Fig. 4.
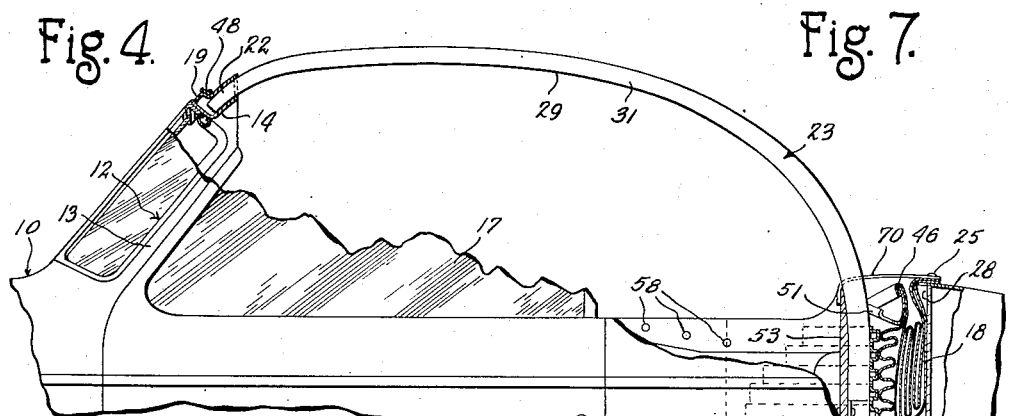
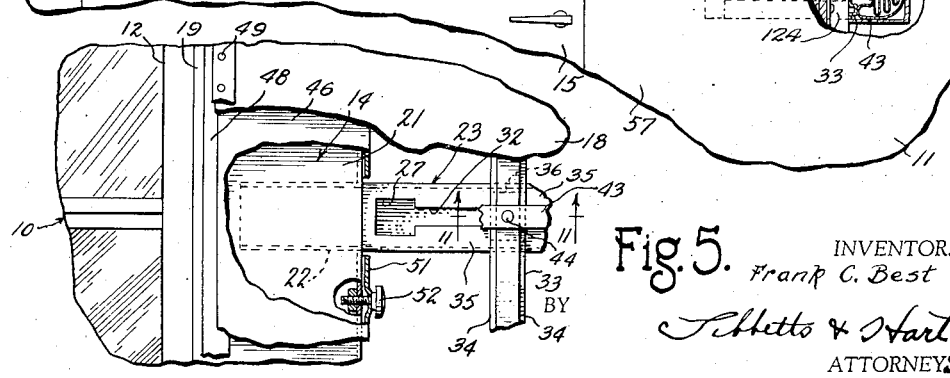
Fig. 5.
INVENTOR.
Frank C. Best
BY
Abbott & Hart
ATTORNEYS July 7, 1942.  F. C. BEST  2,289,173
MOTOR VEHICLE
Filed Jan. 21, 1939  3 Sheets-Sheet 3
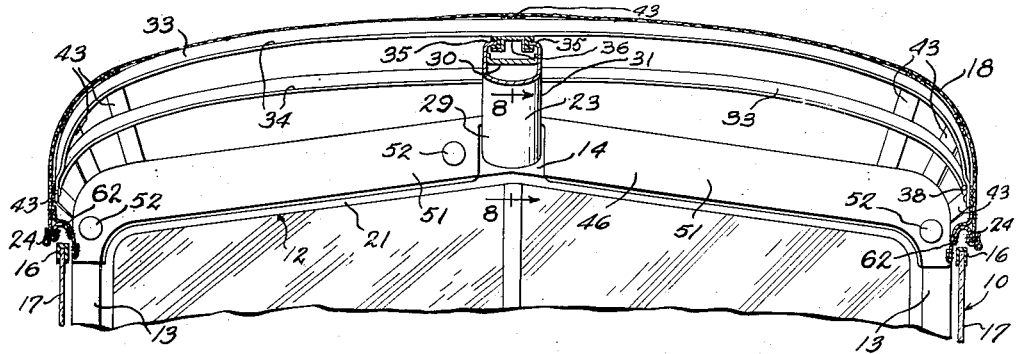
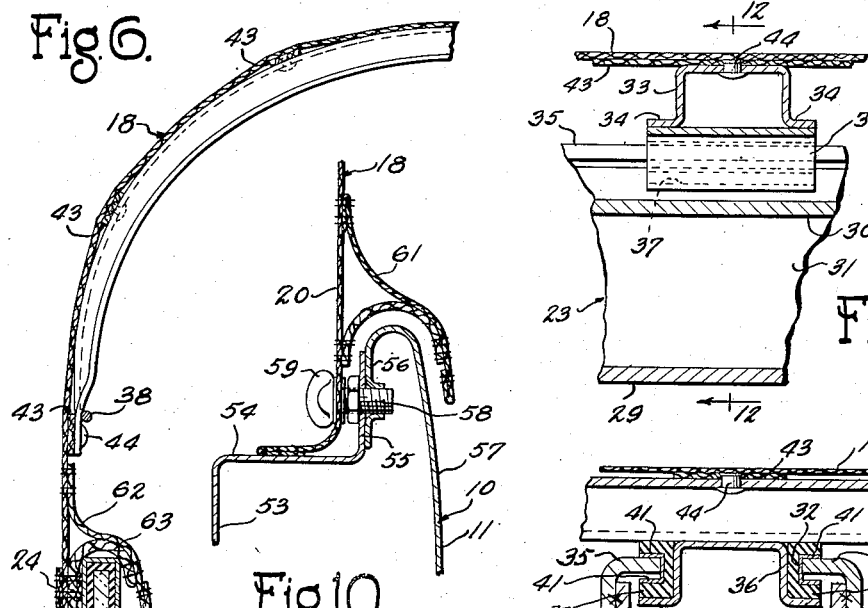
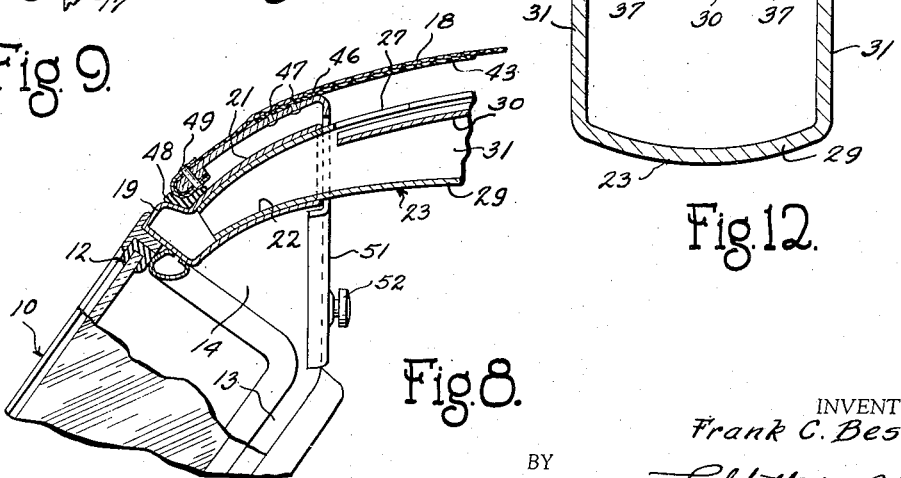
INVENTOR.
Frank C. Best
BY
Sibbitts & Hart
ATTORNEYS Patented July 7, 1942

2,289,173

UNITED STATES PATENT OFFICE 2,289,173

MOTOR VEHICLE

Frank C. Best, Detroit, Mich., assignor to Packard Motor Car Company, Detroit, Mich., a corporation of Michigan Application January 21, 1939, Serial No. 252,139

3 Claims. (Cl. 296—107)

The present invention relates generally to motor vehicles and more particularly to body and top constructions therefor of the type commonly referred to as "convertible" and wherein the top may be raised or lowered to provide either an open or enclosed passenger compartment.

In vehicles of this general character employing a flexible top, the raising and lowering thereof has been a rather difficult and inconvenient operation and it has usually been necessary for the operator to complete the various connecting and securing operations from outside the vehicle, resulting at least, in a disagreeable inconvenience in inclement weather. Fabric or other flexible tops, at present employed, become pinched or wrinkled and require a considerable amount of body space when folded, are inclined to flutter and become noisy when the vehicle is in motion and present an ill-fitting appearance when in raised position. Moreover, in vehicle bodies of this type, it has been a difficult problem to provide a windshield frame of sufficient rigidity without the use of view-obstructing corner posts and headers.

It is therefore one of the objects of the present invention to overcome the objections to present convertible vehicle bodies by the provision of a body and flexible top construction, wherein the top may be easily and quickly raised or lowered and the various connections between the top and body made by one person from within the vehicle, offering full protection to the occupants in inclement weather.

Another object of the invention resides in the provision of a convertible top and vehicle body construction permitting the full use of aerodynamic principles in exterior design, resulting in greater efficiency, a reduction of wind noise, and increased passenger head room.

A further object is to provide a construction of the above character, having greater body and windshield frame rigidity while actually effecting a reduction in the size and weight of the windshield frame, which in turn results in an increased range of vision for the driver.

Another object of the invention is to provide a body and flexible top structure wherein the top fabric will not wrinkle when in lowered position and any slack or looseness thereof, when in raised position, will be automatically taken up to present a neat and well-tailored appearance.

The invention has for a further object the provision of an open or convertible vehicle body with reenforcing top structure, which adds materially to the rigidity thereof.

Other objects and advantages of the invention will become apparent from the following description taken in connection with the accompanying drawings in which:

Fig. 3 is a fragmentary side view, partly in longitudinal section, of a vehicle incorporating the invention and showing the top in raised position;

Fig. 4 is a view similar to that of Fig. 3, but showing the top in lowered or folded position;

Fig. 5 is a fragmentary top plan view with parts broken away and showing the top supporting rail, the top header and the windshield frame header;

Fig. 6 is a transverse view, partly in section, taken from within the vehicle slightly to the rear of the windshield;

Fig. 7 is a fragmentary sectional view taken on the line 7—7 of Fig. 3;

Fig. 8 is a fragmentary view taken substantially on the line 8—8 of Fig. 6;

Fig. 9 is a sectional view taken substantially on the line 9—9 of Fig. 3;

Fig. 10 is a sectional view taken along the line 10—10 of Fig. 3;

Fig. 11 is a longitudinal sectional view taken on the line 11—11 of Fig. 5, and

Fig. 12 is a sectional view taken on the line 12—12 of Fig. 11.

Figure 1:
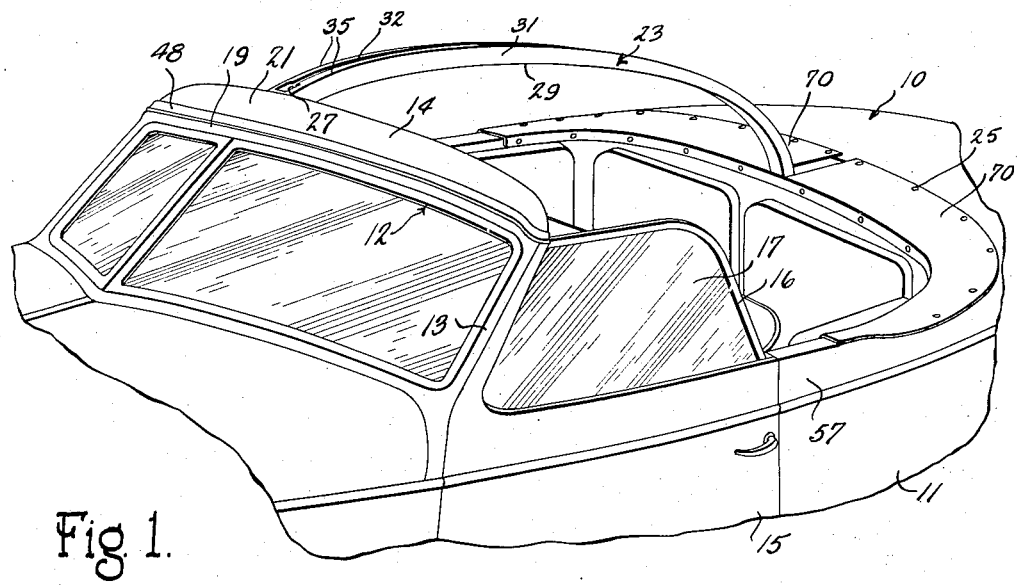
Fig. 1 is a fragmentary perspective view of a motor vehicle employing the present invention and showing the vehicle with the top in lowered position.
Figure 2:
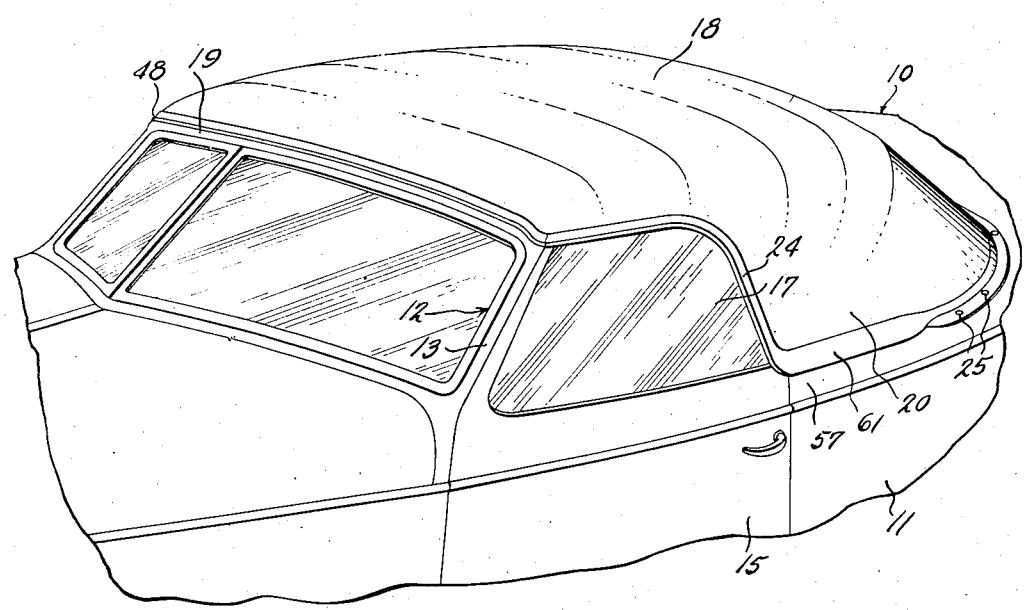
Fig. 2 is a view similar to that of Fig. 1, but showing the top in raised position.

Referring to the drawings, reference numeral 10 indicates a motor vehicle having a body forming a passenger compartment and provided with a rearwardly inclined, upstanding windshield frame 12 including corner posts 13 and an upper header 14. The body may be provided with a door 15 having an upstanding window frame and channel 16 to receive a slidable window glass 17.

The vehicle, as shown, is of the convertible type having a fabric or other flexible top 18 which may be cut and shaped to provide a top cover having a forward edge for engaging the windshield header 14 and downwardly extending side panels 20. The edges 24 of the top engage the window frames 16 and the top of the body side panels to enclose the passenger compartment, the top being adapted to be collapsed or folded into the body 11 when not in use.

In conventional convertible bodies of this character, the open body is objectionably flexible and subject to torsional stresses due to the lack of a rigid support above the passenger compartment between the windshield header and the rear of the body. In accordance with the present invention, the windshield header 14 is of substantial size and includes a transversely extending hollow section 19 supported above the windshield glass by the corner posts 13, and a hollow rearwardly extending socket portion 21 opening adjacent the vehicle center line to receive the forward end 22 of a stiff structural bracing element in the form of a rail 23. The supporting rail may extend into the hollow windshield header portion 21 in telescopic relation thereto, and be welded or otherwise secured in fixed position.

In order to present a stream-lined appearance and provide adequate passenger head room, the top supporting rail 23 may extend longitudinally above the passenger compartment in an upward curve and thence downwardly to the rear of the passenger compartment. The rear end of the rail extends into a top receiving well 28 formed in the body outside of the rear portion of the passenger compartment. This well is formed in the body structure by the inner body shell 53, the outer body shell 57 and a wall structure 240. The rail is secured in the well by a bracket 124 fixed to the rear of shell 53 by bolts 125. This construction resists torsional body stresses and lends exceptional rigidity to the open top of the body structure and also to the windshield frame, thus obviating the necessity for large, view-obstructing corner posts.

The supporting rail in the present invention is utilized as a support for the top fabric structure and to this end may be formed as a hollow box section comprising a lower wall 29, a spaced upper wall 30 and spaced integral side walls 31 provided with inturned horizontal flanges above the upper wall 30 forming a longitudinal slot 32, and spaced tracks 35. The top 18 is transversely supported by a series of slightly resilient spaced ribs 33 of channel section having outturned flanges 34 welded or otherwise secured to slidable retainers 36, adapted to enter the slot 32 in the supporting rail 23 and formed with out-turned flanges 37 cooperating with the tracks 35 to slidingly connect the retainers 36 with the supporting rail 23. The retainers may be inserted in the slot 32 through an enlarged portion 27 thereof adjacent the windshield header 14.

Inasmuch as the transverse supporting ribs 33 may be connected to form a radio antenna, as by lead wire 38 soldered thereto, suitable insulating material 39 may be secured to the sides of the retainers 36 and formed to provide grooves to receive metal channels 41 which in turn slidably cooperate with the tracks 35.

When the top is in raised position, the transverse supporting ribs 33 are maintained in proper spaced relation by a series of longitudinally extending web straps 43 suitably secured as by rivets 44 to each of the transverse ribs 33 and to a forward transverse top header 46 as at 47, and secured at their opposite ends, with the rear edge of the top fabric 18, to the rear deck of the body adjacent the top well 28, as at 25. When the top is in raised position, some of the spacer straps 43 being secured adjacent the ends of the transverse supporting ribs 33 and being secured between the vehicle body at the rear and the top header 46 at their forward ends, the spacer straps are pulled tightly to exert pressure on the ends of the bowed ribs 33 springing them slightly inwardly. The top fabric may be fitted when the ribs 33 are in slightly sprung position, so that a constant pressure is always exerted upon the top fabric to maintain it in a taut and unwrinkled condition.

In accordance with the invention, provision is made for completing the necessary securing connections between the top and body from inside the vehicle. In the present instance, the top header 46 is formed to overlie a sealing gasket 48 along the forward edge of the windshield header 14 and the forward edge of the top fabric 18 is secured to this header as by rivets 49. The header 46 may be provided with a bifurcated downwardly extending flange 51 adapted to overlie the inner face of the windshield header 14, and is in turn provided with thumb screws 52 to engage threaded openings formed in the windshield header for securing the top 18 in raised position.

Referring particularly to Figs. 9 and 10, the vehicle body comprises the inner body shell 53 having an outwardly extending transverse ledge position 54 formed with an upwardly extending flange 55 to engage the downwardly extending flange 56 of the outer body shell 57 extending above the inner shell. The fixed pins 58 of a series of separable snap fasteners may be secured to the outer shell 57 in spaced relation to each other and positioned to the rear of the vehicle doors 15, and the lower edges of the top panels 20 may extend downwardly below the upper edge of the outer body shell 57 to engage the ledge 54 of the inner body shell 53. The panels 20 may be provided with the movable parts 59 of the snap fasteners, cooperating with the pins 58 to secure the top fabric to the body at these points.

To guard against the entrance of water into the passenger compartment, a yieldable shield 61 is secured to the fabric of the panels 20 slightly above the outer body shell 57 and extends downwardly exteriorly of the body below the top of the outer shell 57. A curved strip of resilient fabric may be connected to extend from the panel 20 over the top of the outer body shell to the shield 61 adjacent the lower edge thereof. In this manner it is impossible for water to enter the passenger compartment at these points.

Similarly, the edges 24 of the fabric top forming the window openings extend inwardly of the window frames 16 beyond the outer peripheries thereof and resilient shields 62 are secured to the fabric and extend over the window frames 16 to the interior of the passenger compartment, a strip of yieldable fabric 63 extending between the fabric top and the shield closely engaging the window frame 16.

For closing the top well 28 when the top is in folded position, a cover 70 may be fixed at its forward edge adjacent the forward edge of the top well and extend across the well to be removably secured at 25.

In operation, assuming the top to be in lowered position, the well cover 70 is unsnapped and the operator grasps the top header 46 sliding it along the supporting rail 23 to the windshield header 14 where the forward edge thereof engages the sealing molding 48. As the top header 46 moves forwardly, it carries with it the top fabric 18, the transverse supporting ribs 33 and the spacer straps 43. The thumb screws 52 between the headers 14 and 46 and the snap fastener connections 58—59 between the top side panels 20 and the body may be completed by the operator at his leisure from within the passenger compartment. The top may be lowered by simply loosening the above connections and sliding the ribs and top fabric along the longitudinal support into the top well 28 and buttoning the top cover 70 in place.

It will be obvious to those skilled in the art that various modifications in construction and design may be made without departing from the spirit or scope of the invention, which is to be limited only by the appended claims.

What is claimed is:

1. A vehicle body comprising an open top structure, a transversely extending windshield header fixed to the front portion of said structure, a top structural member extending centrally and longitudinally over the open portion of the structure, means fixing the forward end of the top structural member to the windshield header, and means fixing the rear end of the top structural member to the open top structure adjacent the rear end of the open portion thereof.

2. A vehicle body comprising an open top structure, a transversely extending windshield header fixed to the front portion of said structure, a hollow elbow opening toward the rear and fixed to the central portion of said windshield header, a top structural member extending centrally and longitudinally over the open portion of said structure, said top structural member being seated in the rearwardly opening portion of the hollow elbow, and means fixing the rear end of the top structural member to the open top structure adjacent the rear end of the open portion thereof.

3. In a vehicle body, an open top passenger compartment, a windshield frame header at the forward end of the compartment, an open well in the body outside of the rear portion of the passenger compartment, a rigid top structural member extending centrally and longitudinally over the open compartment and projecting into the well, means fixing the forward end of the support member to the windshield frame header, means fixing the rear end of the support member projecting into the well to the body, and a top for the passenger compartment slidably mounted on the top structural member and collapsible into the well.

FRANK C. BEST.